Sept. 9, 1958 G. A. BOGART 2,850,839
WALKING ANIMAL TOY
Filed Feb. 15, 1955 2 Sheets-Sheet 1
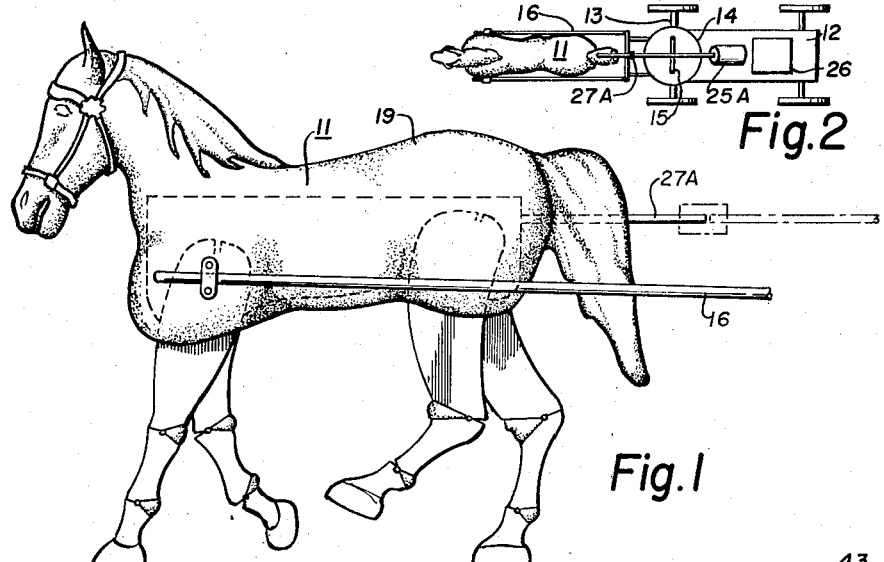
Fig.2
Fig.1
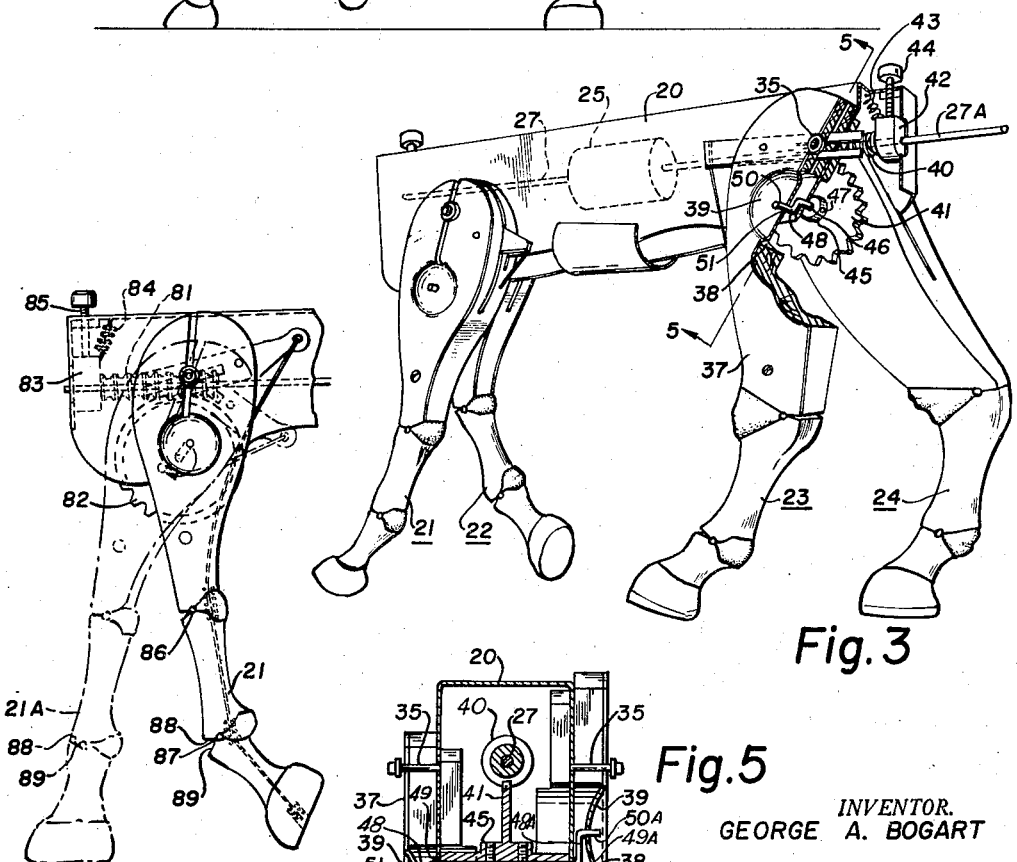
Fig.3
Fig.4
Fig.5
INVENTOR.
GEORGE A. BOGART
BY Woodling and Krost,
attys.

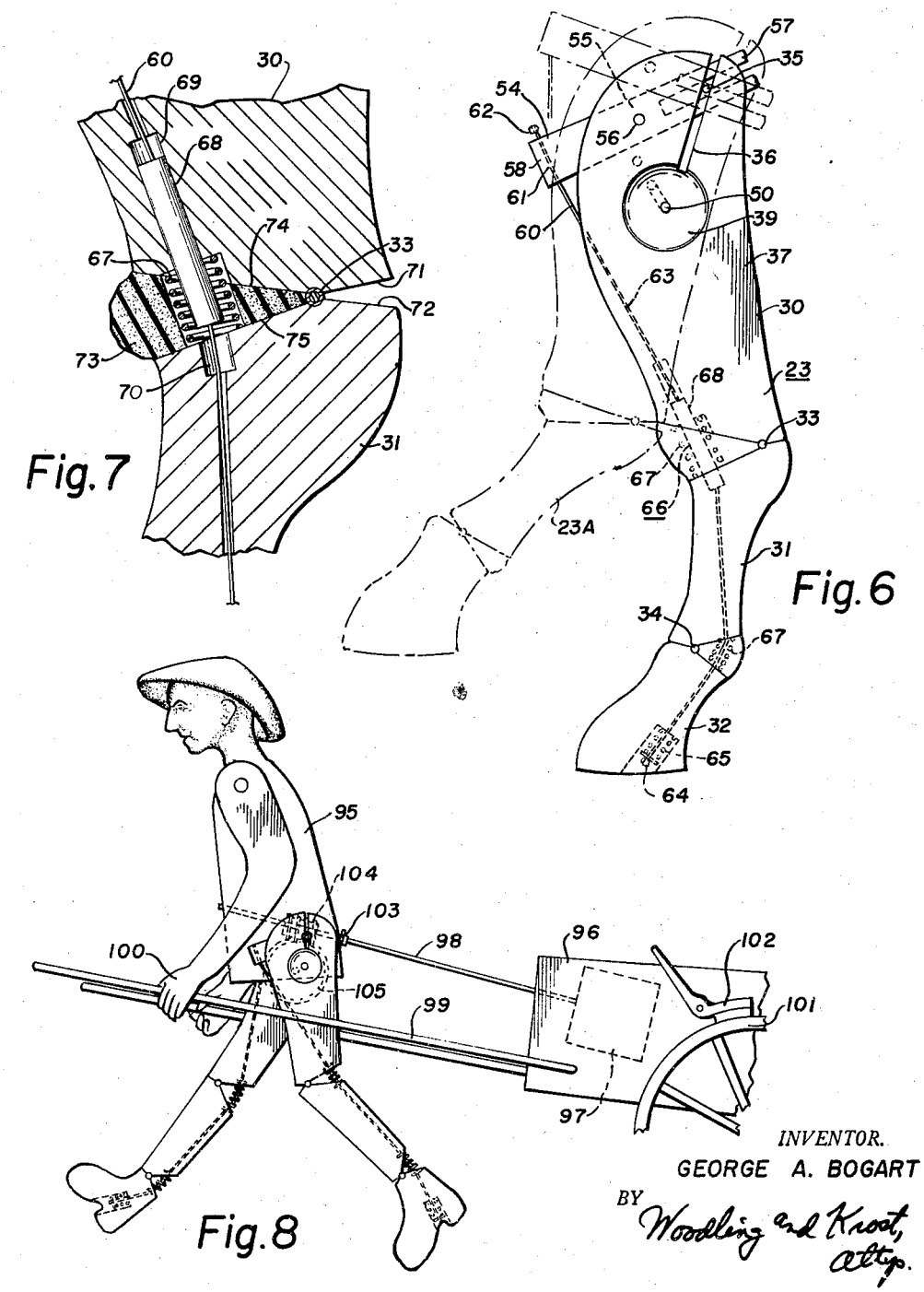

United States Patent Office 2,850,839
Patented Sept. 9, 1958

2,850,839

WALKING ANIMAL TOY

George A. Bogart, Cleveland, Ohio

Application February 15, 1955, Serial No. 488,195

13 Claims. (Cl. 46—150)

The invention relates in general to mechanically actuated simulated animals and more particularly to animals, whether two-legged or four-legged, which have the legs movable to provide the source of locomotion of the animal on a supporting surface.

Simulated animals, such as horses or men, with movable legs for walking on a supporting surface have been known for many years and the present invention is an improvement on these devices whether the device is used as a toy or used as a large sized animal to provide pulling power for loads, such as human beings.

An object of the invention is to provide a mechanical animal which is simple and rugged in construction.

Another object of the invention is to provide a mechanical animal which may be attached to a wheeled vehicle to provide the stability to the animal and to provide a source of power, if necessary, as well as providing for steering the combined animal and wagon and one wherein the leg movements are natural and lifelike.

Another object of the invention is to provide a mechanical animal having a tarsal or similar joint which bends forwardly with a locking arrangement so that the leg may be locked cyclically so that it will not collapse as the leg is moved rearwardly and so the leg may provide forward locomotion to the animal and to the wagon or cart drawn by the animal.

Another object of the invention is to provide an animal, such as a horse, which may have any one of several gaits and where any desired gait may be easily selected.

Other objects and a fuller understanding of this invention may be had by referring to the following description and claims, taken in conjunction with the accompanying drawings, in which:

Figure 1 is a side elevation of a mechanical horse embodying the invention;

Figure 2 is a plan view of the horse of Figure 1 drawing a wagon;

Figure 3 is a perspective view of the four legs of the horse and the drive mechanism;

Figure 4 is a side view of the drive mechanism of one of the fore legs in two alternative positions;

Figure 5 is a sectional view on the line 5—5 of Figure 3;

Figure 6 is a side view of one of the rear legs in two alternative positions;

Figure 7 is an enlarged sectional view of the lock means for the tarsal joint; and Figure 8 shows the invention embodied in a two-legged animal, a man, pulling a two-wheeled cart.

The Figures 1 to 7 illustrate features of the invention embodied in a horse which is representative of four-legged animals, the legs of which may be driven by the mechanism of this invention. The Figure 1 shows a side view of the horse 11 and Figure 2 shows the horse 11 pulling a wagon 12. This wagon 12 may be a four-wheeled wagon having a front axle 13 mounted on a fifth wheel 14 for steering purposes by means of a tiller 15. Shafts 16 lead from the fifth wheel 14 to the horse 11 to provide sideways stability to the horse 11.

The body 19 is shaped to resemble a horse or other desired animal and has a chassis or frame 20 within the body 19, fore legs 21 and 22, and rear legs 23 and 24.

When the horse 11 is desired to be a miniature device such as a toy, a small electric motor 25 may be positioned within the frame 20 and energized by batteries 26 carried in the wagon 12. Alternatively, the motor 25 may be mounted in the wagon 12 as shown at 25A in Figure 2. In such case the motor 25A has a drive shaft 27A extending from the wagon to the horse to provide the motive power for driving the legs. If the motor 25 is positioned in the frame 20, it may be positioned centrally thereof and have a double ended shaft 27 leading to the fore part and the aft part of the frame 20. In either event the shaft 27 or 27A provides the motive power means.

The drive means to each of the rear legs 23 and 24 is identical, that is, the cycle is identical, however the phase of motion of the two rear legs is selectively different. The Figure 6 shows one of the rear legs 23 which shall be described, and the description thereof will be understood to apply equally well to the other rear leg 24. The rear leg 23 has an upper portion 30, a lower portion 31, and a hoof portion 32. A first joint 33 interconnects the upper and lower portions 30 and 31 and a second joint 34 interconnects the lower and hoof portions 31 and 32. These may be hinges with the axes transverse to the leg and transverse to the body 19.

The frame 20 carries a rear pivot 35 shown in Figures 3, 5, and 6 which is fixed and transverse to the frame 20. The leg upper portion 30 has a generally vertical slot 36 in which the pivot 35 is received; thus, the leg 23 may slide generally vertically as well as pivot on the pivot axle 35. The legs may be made of any suitable material for the purpose desired, even of wood or plastic, and preferably a metal bearing plate 37 is fastened to the outer side of the upper portion 30. The upper leg portion 30 is provided with a large hole 38 and the metal bearing plate 37 has an indented portion 39 at this hole 38.

The shaft 27 carries a worm gear 40 which meshes with and drives a worm wheel 41 journalled in the frame 20 on a transverse axis. The shaft 27 is journalled in a bearing block 42 which is pulled upwardly into the frame 20 by a spring 43 and held downwardly in a desired position by an adjustment screw 44. This adjustment screw 44 can be adjusted for proper intermeshing driving engagement between the worm gear 40 and worm wheel 41 and has enough vertical movement to permit the gear and wheel to be completely disengaged, to change the phase between the fore and rear legs, as will subsequently be described. The worm wheel 41 is fixedly attached to a double-sided hub 45. Shafts 46 and 46A extend into the hub 45 and are held there by set screws 47. First and second crank arms 48 and 48A are fixedly attached to the shafts 46 and 46A, respectively, and rotate therewith and extend through bearing holes 49 and 49A in the frame 20. Crank portions 50 and 50A of these crank arms 48 and 48A extend through drive holes 51 in the indented portions 39. Thus as the crank portion 50 rotates in a counterclockwise direction, as viewed in Figure 3, the leg 23 is moved forwardly and backwardly pivoting about the pivot axle 35 and is also moved up and down sliding on the pivot 35.

A drive lever 54 is pivoted at the mid-portion 55 to the leg upper portion 30 by pivot pins 56. A first end 57 of the lever is forked to encompass the fixed rear pivot 35. The second end 58 of the lever 54 extends forwardly, that is, extends away from the pivot 35 in the direction of the pivot pin 56. Also, the pivot pin 56 is close to a horizontal plane passing through the pivot axle 35. This, of course, varies as the leg 23 is swung forwardly and backwardly.

A flexible cable 60 has a sliding connection at 61 with the second end 58 of the lever 54, but a cable clamp 62 maintains positive connection between the flexible cable 60 and the lever 54. The flexible cable 60 extends downwardly through a hole or slot 63 in the leg 23. The cable 60 passes through the upper leg portion 30, passes forwardly of the first joint 33, passes through the lower leg portion 31, passes through the rear part of the second joint 34, and extends into the hoof portion 32. A cable clamp 64 is attached to the lower end of the flexible cable 60 and interconnects the lower end of the cable 60 with the hoof portion 32 through a compression spring 65. Thus, the natural resiliency of the spring 65 tends to extend the cable 60 and keep it taut.

The first joint 33 is called a tarsal joint. A horse is peculiar to several animal species wherein this lower leg portion 31 bends forwardly relative to the upper leg portion 30. A lock means 66 is provided in the first joint 33 to prevent this joint from collapsing under forward drive conditions of the leg 23. A compression spring 67 is provided at the first joint 33, and also at the joint 34, but this is not stiff enough to prevent collapse of the joint 33 under drive conditions; and it will be seen that if no lock means 66 were provided, then the joint 33 would tend to collapse as the upper leg portion 30 was moved rearwardly. This rearward movement of the upper leg portion 30 is the motive force to move the entire horse 11 and wagon 12 forwardly and thus the joint 33 must be kept from collapsing. The lock means 66 thus selectively and cyclically locks the joint 33.

The lock means 66 includes a lock bar 68 which is part of and moves with the flexible cable 60. The lock bar is slideably receivable in an upper recess 69 in the upper leg portion 30 and also may be received in a lower recess 70 in the lower leg portion 31. When there is no upward pulling force on the flexible cable 60, the compression spring 67 expands the joints 33 and 34 and the compression spring 65 extends the cable 60 with the combined effect of these spring means 65 and 67 being to pull the lock bar 68 downwardly to the lower recess 70. This is the condition shown in Figure 6. The lock bar 68 is long enough to extend into both lower and upper recesses when the first joint 33 is expanded. Also, the upper recess 69 is deep enough to receive practically the entire length of the lock bar 68 to unlock the joint 33. The Figure 7 shows the unlocked condition with the joint 33 partially collapsed. When the joint 33 is expanded as by the springs 67, the leg 23 is held in a straightened or stiffened position by abutment of surfaces 71 and 72 on the upper and lower leg portions, respectively. This is as shown in Figure 6. The second joint 34 also has similar abutment surfaces to establish the straightened or stiffened position of the leg 23. Sponge rubber 73 may be used to cover the joints 33 and 34, and especially to cover the spring 67 and lock bar 68 to give a more natural appearance to the legs of the animal. This may be glued or otherwise attached to the surfaces 74 and 75 on the upper and lower leg portions, respectively; and when these surfaces 74 and 75 come into substantial engagement with the compressed sponge rubber therebetween, this limits the degree of collapse of the joint.

The fore legs 21 and 22 of the horse 11 operate in a very similar manner with a worm gear 81 also driven from the shaft 27 and capable of meshing with a worm wheel 82. The forward end of the shaft 27 is supported in a bearing block 83 urged upwardly by a spring 84 and held in a downwardly adjusted position by an adjustment screw 85. The worm wheel 82 again turns oppositely disposed cranks to actuate the fore legs 21 and 22 in essentially the same manner as the two crank arms 48 and 48A actuate the rear legs 23 and 24. One difference may be that the lock means 66 need not be provided in the upper joints 86 of the fore legs of the horse if the horse 11 is adapted only for forward driving movement. If it is desired to make the horse 11 operate in a rearward driving movement, then locks should be provided in all joints including the upper joints 86 and the lower joints 87 of the fore legs plus the upper and lower joints 33 and 34 of the rear legs.

The horse 11 is an embodiment of the invention in a four-legged animal and any gait which an actual horse may have may be simulated in the horse 11 of this invention. A walking gait is the simplest and easiest to understand, and in such case the crank arm 48 driving the leg 23 is one hundred eighty degrees out of phase with the crank arm 48 driving the other rear leg 24. The dictionary gives the following chart showing the position of the various legs for each of six gaits:

| Walk | 314 | 14 | 142 | 42 | 423 | 23 | 231 | 31 | 314 |
|---|---|---|---|---|---|---|---|---|---|
| Singlefoot (amble) | 42 | 2 | 23 | 3 | 31 | 1 | 14 | 4 | 42 |
| Canter | 4 | 42 | 423 | 23 | 231 | 31 | 1 | 0 | 4 |
| Pace | 4 | 42 | 0 | 3 | 31 | 0 | 4 | | |
| Trot | 2 | 23 | 3 | 0 | 1 | 14 | 4 | 0 | 2 |
| Gallop | 3 | 34 | 4 | 41 | 1 | 12 | 2 | 0 | 3 |

In the above chart the Figures 1, 2, 3 and 4, respectively, indicate the left fore foot, right fore foot, left hind foot, and right hind foot. The various numbers in the above chart in any particular row and column thus indicate which of the various feet of the horse are in contact with the ground at any particular instant with the repetitious cycle of the gait being divided into eight successive intervals. A zero in any particular column and row indicates that at that precise instant there is no foot in contact with the ground. From the above chart it will be seen that when a horse is walking, each foot is on the ground approximately five-eighths of the time, the rear feet are about one hundred eighty degrees out of phase, the fore feet are about one hundred eighty degrees out of phase, and the right hind leg is approximately ninety degrees ahead of the right fore leg. For any of the other gaits of the horse the feet are generally on the ground for a shorter period of time and the phase between the fore and rear legs varies as well as the phase between each of the fore legs and each of the rear legs. Any of these various gaits may be set up in the horse 11 by loosening the set screws 47 to adjust the phase between the rear legs and then retightening the set screws. Similar set screws are provided to adjust the phase between the fore legs 21 and 22. Also, the adjustment screw 44 or the adjustment screw 85 may be backed off to completely disengage the associated worm gear and worm wheel and thus the phase between the fore and rear legs may be adjusted.

*Operation*

The legs of the horse 11 are shown as adjusted for a walking gait and as the drive shaft 27 rotates, this rotates the worm gears 40 and 81. This slowly rotates the worm wheels 41 and 82. This rotates the drive cranks or crank arms in a counterclockwise direction as shown in the Figures 3, 4, and 6. As the crank arm 48 starts to move from the position shown in Figure 3, for example, the crank portion 50 is moving rearwardly and slightly downwardly. The primary movement is rearwardly to move the entire leg rearwardly and thus drive the horse 11 forwardly. There is a slight component of downward movement such that the leg at the slot 36 slides somewhat on the pivot axle 35. As the crank portion 50 reaches about the rearward portion of its throw at about the four o'clock position, there is an upward component of force tending to raise the entire leg slidingly on the pivot 35. This also moves the pivot pin 56 upwardly and thus the drive lever 54 through this compound action swings in a clockwise direction relative to the leg upper portion 30. This means that the second end 58 of the lever 54 rapidly moves upwardly to pull upwardly on the flexible cable 60. This pulls the lock bar 68 out of the lock recess 70 to unlock the tarsal joint 33. Both a spring 67 and a spring 65 collapse to permit this upward movement of the cable 60 and thus both joints 34 and 33 collapse. This shortens the vertical height of the entire leg and also shortens the vertical distance between the hoof portion 32 and the body 19, with this latter mentioned vertical foreshortening aided by the upward movement of the crank portion 50 at this time. The Figure 6 shows a dotted line position 23A of the leg 23 when it has reached approximately the uppermost position thereof and a position approximately one hundred eighty degrees out of phase of the solid line position of Figure 6. This solid line position of Figure 6 shows the crank portion 50 at about the five o'clock position and the dotted line position 23A of Figure 6 is therefore with the crank portion 50 at about the eleven o'clock position. At this dotted line position 23 of Figure 6 therefore the crank portion 50 is moving forwardly and downwardly. The forward movement of the crank portion 50 thus continues to move the upper leg portion 30 forwardly somewhat and the downward movement of the crank 50 moves the entire leg downwardly to permit the lever 54 to swivel downwardly rapidly, thus releasing the cable 60. The action of the spring 67 tending to expand the joints 33 and 34 plus the action of the spring 65 thus pulls the lock bar 68 into position in the lower recess 70 before the hoof 32 strikes the ground. Thus, the leg is straightened out and stiffened and locked into position so that, as the upper leg portion 30 is moved rearwardly by the crank portion 50, a forward driving motion to the horse 11 may be obtained without collapse of the tarsal joint 33.

The Figure 4 shows in solid lines a position of the fore leg 21 when the crank arm driving this leg is at about the one o'clock position, and this Figure 4 also has a dotted line position 21A wherein the drive crank for this leg is approximately at the eight o'clock position. In the solid line position of Figure 4 the joints are partially collapsed which shortens the overall vertical dimension of the leg 21. In the dotted line position of Figure 4 the leg is practically fully extended with the joints 86 and 87 expanded and with the abutting surfaces 88 and 89 in engagement, with such abutting surfaces similar to the surfaces 71 and 72 of Figure 7. Because of the engagement of these abutting surfaces 88 and 89, no lock means similar to the lock means 66 is needed in the fore legs 21 and 22. This, of course, is for forward drive movement of the horse 11 and if it is desired that the horse move in reverse, then lock means similar to the lock means 66 may be provided for all leg joints. To provide this reverse drive of the horse 11, it is only necessary to reverse the driving direction of the crank arms and this may be easily accomplished by reversing the direction of the drive shaft 27 such as by reversing the motor rotational direction.

The horse and wagon may be steered by movement of the tiller 15 which will adjust the angular direction of the horse 11 and front axle relative to the rest of the wagon 12. Where the drive shaft 27A is used to extend from a motor 25A in the wagon to the horse, this drive shaft 27A may also be used as part of the stabilizing means for lateral stability to the horse 11.

The Figure 8 shows the invention as embodied in a two-legged animal, such as an ostrich, or as shown in Figure 8, a man, depicted as a coolie 95 pulling a two-wheeled cart 96. A motor 97 may be provided in the cart 96 with a drive shaft 98 extending to the man 95 to provide a motive power. This would be similar to the drive for the fore legs 21 and 22 of the horse 11. Wagon shafts 99 extend from the cart 96 to the hands 100 of the man for lateral stability in conjunction with the drive shaft 98. Lock means similar to the lock means 66 may be provided for the leg joints of the man 95 if it is desired to have him walk backwardly. The man 95 and cart 96 may be steered by the simple expedient of selectively applying brakes to either wheel 101 of the cart as by the brake lever 102 or the man's hands 100 may be shifted on the shafts 99 to twist the man 95 relative to the cart 96 to thus make the entire man and cart turn in a desired direction. This may be accomplished by a flexible coupling 103 in the drive shaft 98 or by a small amount of play between the worm gear 104 and worm wheel 105.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mechanical animal comprising, a body, at least one movable leg having an upper and lower leg portion, said leg having a foot, means to movably connect said leg upper portion to said body, drive means to cyclically move said leg back and forth between forward and rearward regions, said drive means including flexible tension means to raise said leg upper portion and to shorten the vertical distance between said foot and said body at the rearward region, said drive means also including means to release said flexible tension means and spring means to lengthen the vertical distance between said foot and said body at the forward region, and means synchronized with said drive means to maintain the lengthened vertical distance of said leg throughout a majority of the rearward movement of said leg.

2. A mechanical animal having a body and a movable leg for locomotion on a supporting surface, comprising, an upper and a lower leg portion connected by a first joint, a foot portion connected to said lower leg portion by a second joint, means to movably connect said upper leg portion to said body at a first connection, a lever extending on a first side of said first connection and pivoted at a mid-section of said lever to said leg upper portion, a first and a second end on said lever, means to connect said lever first end to said first connection, a flexible cable connected to said lever second end, said flexible cable extending downwardly through said leg and through said joints and connected to said foot portion, spring means acting on said joints to extend said cable and expand said joints, and drive means to cyclically swing said leg upper portion back and forth and to act on said lever to cyclically raise said lever second end whereby as the leg is moved forwardly said flexible cable causes collapsing of said two joints to shorten the vertical height of said leg, and whereby said drive means cyclically releases said cable and said spring means thereby straightens the leg for forward driving engagement with the supporting surface.

3. A mechanical animal having a body and a movable leg for locomotion on a supporting surface, comprising, an upper and a lower leg portion connected by a first joint, a foot portion connected to said lower leg portion by a second joint, means to movably connect said upper leg portion to said body at a first connection, a lever extending on a first side of said first connection and pivoted at a mid-section of said lever to said leg upper portion, a first and a second end on said lever, means to connect said lever first end to said first connection, a flexible cable connected to said lever second end, said flexible cable extending downwardly through said leg and through said joints and connected to said foot portion, spring means acting on said joints to extend said cable and expand said joints, a lock bar included as part of said cable and receivable in recesses in each of said upper and lower leg portions to lock same together, said spring means urging said lock bar into the locked condition, said upper leg recess being sufficiently deep to receive said bar upon pulling on the top of said cable to unlock said first joint, and drive means to cyclically swing said leg upper portion back and forth and to act on said lever to cyclically raise said lever second end whereby as the leg is moved forwardly said flexible cable causes collapsing of said two joints to shorten the vertical height of said leg, and whereby said drive means cyclically releases said cable and said spring means thereby moves said lock bar into locking condition to stiffen the leg for forward driving engagement with the supporting surface.

4. A mechanical animal having a body and at least two movable legs for locomotion on a supporting surface, each of the two legs comprising, an upper and a lower leg portion connected by a first joint, a foot portion connected to said lower leg portion by a second joint, means for pivotally connecting said upper leg portion to said body, a lever pivoted to each said leg near said body pivot, a first and a second end on said lever, a flexible cable connected to said lever second end, pivotal connections at each of said joints, said flexible cable extending downwardly through said leg and through said joints and terminating in said foot portion, spring means interconnecting the lower end of said flexible cable and said foot portion and acting on said joints to extend said cable and expand said joints, and drive means to swing said leg upper portion back and forth and to cyclically act on said lever first end to cyclically pull upwardly on said cable as the leg reaches the rearmost region of its stroke to effect a collapsing of both said joints as the leg is moved forwardly to lift the lower leg portion, and whereby said drive means cyclically releases said cable and said spring means thereby straightens the leg for forward driving engagement with the supporting surface.

5. A mechanical animal having a body and at least two movable legs for locomotion on a supporting surface, each of the two legs comprising, an upper and a lower leg portion connected by a first joint, a foot portion connected to said lower leg portion by a second joint, means for pivotally connecting said upper leg portion to said body, a level pivoted to each said leg near said body pivot, a first and a second end on said lever, a flexible cable connected to said lever second end, pivotal connections at each of said joints, said flexible cable extending downwardly through said leg and the forward part of said first joint and the rearward part of said second joint and terminating in said foot portion, spring means interconnecting the lower end of said flexible cable and said foot portion and acting on said joints to extend said cable and expand said joints, a lock bar included as part of said cable and receivable in recesses in each of said upper and lower leg portions to lock same together, said spring means urging said lock bar into the locked condition, said upper leg recess being sufficiently deep to receive said bar upon pulling on the top of said cable to unlock said first joint, and drive means to swing said leg upper portion back and forth and to cyclically act on said lever first end to cyclically pull upwardly on said cable as the leg reaches the rearmost region of its stroke to effect a collapsing of both said joints as the leg is moved forwardly to lift the lower leg portion, and whereby said drive means cyclically releases said cable and said spring means thereby moves said lock bar into locking condition to stiffen the leg for forward driving engagement with the supporting surface.

6. A mechanical animal having a body and at least two legs for moving on a supporting surface, comprising, first and second drive cranks rotatable about an axis transverse to said body, a pivot carried by said body, each of the two legs having an upper and a lower leg portion interconnected by a first joint and having said lower leg portion and a foot portion interconnected by a second joint, each of said legs including, a surface defining a slot in said leg upper portions for pivotable sliding movement of said leg on said pivot, means to connect said first and second drive cranks to the top end of said leg upper portions, a lever pivoted to each said leg near said body pivot, a first and a second end on said lever, said lever first end being connected to said body pivot to move said lever relative to said leg as said leg is cranked by said crank, a flexible cable connected to said lever second end, pivotal connections at each of said joints, said flexible cable extending downwardly through said leg and said joints and terminating in said foot portion, and spring means interconnecting the lower end of said flexible cable and said foot portion and acting on said joints to extend said cable and expand said joints, whereby rotation of said drive cranks impart a cranking motion to the upper end of each said leg and which acting through said lever and cable effects collapsing of both said joints as the leg is moved forwardly to lift the lower leg portion and whereby said cranking action releases said cable and said spring means thereby straightens the leg for forward driving engagement with the supporting surface.

7. A mechanical animal having a body and at least two legs for moving on a supporting surface, comprising, first and second drive cranks rotatable about an axis transverse to said body, a pivot carried by said body, each of the two legs having an upper and a lower leg portion interconnected by a first joint and having said lower leg portion and a foot portion interconnected by a second joint, each of said legs including, a surface defining a slot in said leg upper portions for pivotable sliding movement of said leg on said pivot, means to connect said first and second drive cranks to the top end of said leg upper portions, a lever pivoted to each said leg near said body pivot, a first and a second end on said lever, said lever first end being connected to said body pivot to move said lever relative to said leg as said leg is cranked by said crank, a flexible cable connected to said lever second end, pivotal connections at each of said joints, said flexible cable extending downwardly through said leg, the forward part of said first joint, the rearward part of said second joint and terminating in said foot portion, means interconnecting the lower end of said flexible cable and said foot portion and spring means acting on said joints to extend said cable and expand said joints, a lock bar included as part of said cable and receivable in recesses in each of said upper and lower leg portions to lock same together, said spring means urging said lock bar into the locked condition, said upper leg recess being sufficiently deep to receive said bar upon pulling on the top of said cable to unlock said first joint, whereby rotation of said drive crank imparts a cranking motion to the upper end of said leg and which lifts the upper leg portion and acting through said lever and cable effects collapsing of both said joints as the leg is moved forwardly to lift the lower leg portion and whereby said cranking action releases said cable and said spring means moves said lock bar into locking condition to stiffen the leg for forward driving engagement with the supporting surface.

8. A mechanical animal having a body and at least two legs for walking and running on a supporting surface, comprising, a drive motor, a gear slowly rotatable from said motor about an axis transverse to said body, a pivot carried by said body, each of the two legs having an upper and a lower leg portion interconnected by a first joint and having said lower leg portion and a foot portion interconnected by a second joint, each of said legs including, a surface defining a generally vertical slot in said leg upper portions for pivotable sliding movement of said leg on said pivot, first and second crank arms driven from said gear and drivably connected to the top end of said leg upper portions at a point below said body pivot, a lever pivoted to each said leg at a point forward of said body pivot, a drive and a driven end on said lever, a surface defining a fork on said drive end of said lever, said fork straddling said body pivot to move said lever relative to said leg as said leg is cranked by said crank, a flexible cable slidably and positively connected to said lever driven end, a rear pivot at said first joint, a front pivot at said second joint, said flexible cable extending downwardly through said leg, the forward part of said first joint, the rearward part of said second joint and terminating in said foot portion, first spring means interconnecting the lower end of said flexible cable and said foot portion to extend said cable, second spring means acting on said joints to also extend said cable and expand said joints, upper and lower aligned recesses in said leg on opposite sides of said first joint, a lock bar included as part of said cable and receivable in said recesses, said first spring means urging said lock bar into the bottom of said lower recess, said bar having a length sufficient to extend from the bottom of said lower recess into part of said upper recess upon expansion of said first joint to lock said first joint in the expanded position, said upper recess being sufficiently deep to receive said bar upon pulling on the top of said cable to unlock said first joint, whereby rotation of said crank arm imparts a cranking motion to the upper end of said leg and which acting through said lever and cable effects collapsing of both said joints as the leg is lifted and moved forwardly to lift the lower leg portion and whereby said cranking action releases said cable and said spring means moves said lock bar into locking position to stiffen the leg for forward driving engagement with the supporting surface.

9. A many-gaited mechanical horse having a body and four movable legs for walking, cantering, pacing, trotting, and galloping on a supporting surface, comprising, a drive motor, fore and aft gears slowly rotatable from said motor about axes transverse to said body, a pivot carried at the rear of said body, the two rear legs of said horse having an upper and a lower leg portion interconnected by a tarsal joint and having said lower leg portion and a hoof portion interconnected by a fetlock joint, each of said rear legs including, a surface defining a generally vertical slot in said rear leg upper portions for pivotable sliding movement of said rear leg on said pivot, first and second crank arms driven from said aft gear and drivably connected to the top end of the upper portion of the right and left rear legs at a point below said body pivot, a lever pivoted to each said rear leg at a point forward of said body pivot, a drive and a driven end on said lever, a surface defining a fork on said drive end of said lever, said fork straddling said body pivot to move said lever relative to said leg as said leg is cranked by said crank, a flexible cable slidably and positively connected to said lever driven end, a rear pivot at said tarsal joint, a front pivot at said fetlock joint, said flexible cable extending downwardly through said leg, the forward part of said tarsal joint, the rearward part of said fetlock joint and terminating in said hoof portion, first spring means interconnecting the lower end of said flexible cable and said hoof portion to extend said cable, second spring means acting on said joints to also extend said cable and expand said joints, upper and lower aligned recesses in said leg on opposite sides of said tarsal joint, a lock bar included as part of said cable and receivable in said recesses, said first spring means urging said lock bar into the bottom of said lower recess, said bar having a length sufficient to extend from the bottom of said lower recess into part of said upper recess upon expansion of said tarsal joint to lock said tarsal joint in the expanded position, said upper recess being sufficiently deep to receive said bar upon pulling on the top of said cable to unlock said tarsal joint, whereby rotation of said crank arm imparts a cranking motion to the upper end of said leg and which acting through said lever and cable effects collapsing of both said joints as the leg is lifted and moved forwardly to lift the lower leg portion and whereby said cranking action releases said cable and said spring means moves said lock bar into locking position to stiffen the leg for forward driving engagement with the supporting surface, movable forelegs on said horse, means for driving said forelegs from said fore gear, means for varying the phase between said forelegs to change the gait of said horse, and means for varying the phase between said forelegs and said rear legs to change the gait of said horse.

10. A mechanical animal having a body and a movable leg for locomotion on a supporting surface, comprising, an upper and a lower leg portion connected by a joint, means to movably connect said upper leg portion to said body, drive means, a flexible tension member connected to said drive means, said flexible tension member extending between said upper and lower leg portions to act thereon, spring means acting on said joint to extend said tension member and expand said joint, and said drive means connected to cyclically swing said leg upper portion back and forth, whereby as the leg is moved forwardly said flexible tension member is pulled to cause collapsing of said joint to shorten the vertical height of said leg, and whereby said drive means cyclically releases said tension member and said spring means thereby straightens the leg for forward driving engagement with the supporting surface.

11. A mechanical animal having a body and a movable leg for locomotion on a supporting surface, comprising, an upper and a lower leg portion connected by a joint, means to movably connect said upper leg portion to said body at a first connection, a lever pivoted to said leg upper portion and to said body, a flexible tension member connected to said lever, said flexible tension member extending downwardly and connected to said leg at other than said upper portion, spring means acting on said joint to extend said tension member and expand said joint, and drive means to cyclically swing said leg upper portion back and forth and to act on said lever, whereby as the leg is moved forwardly said flexible tension member causes collapsing of said joint to shorten the vertical height of said leg, and whereby said drive means cyclically releases said tension member and said spring means thereby straightens the leg for forward driving engagement with the supporting surface.

12. A mechanical animal having a movable leg for locomotion on a supporting surface, comprising, an upper and a lower leg portion connected by a joint, means to movably connect said upper leg portion to said body at a first connection, a lever pivoted to said leg upper portion, means to pivotally connect said lever to said body, a flexible cable connected to said lever, said flexible cable extending downwardly through said joint and connected to said leg, spring means acting on said joint to extend said cable and expand said joint, and drive means to cyclically swing said leg upper portion back and forth and to act on said lever to cyclically pull on said cable whereby as the leg is moved forwardly said flexible cable causes collapsing of said joint to shorten the vertical height of said leg, and whereby said drive means cyclically releases said cable and said spring means thereby straightens the leg for forward driving engagement with the supporting surface.

13. A mechanical animal having a body and a movable leg for locomotion on a supporting surface, comprising, an upper and a lower leg portion connected by a joint, means to movably connect said upper leg portion to said body at a first connection, a lever extending on a first side of said first connection and pivoted at a mid-section of said lever to said leg upper portion, a first and a second end on said lever, means to connect said lever first end to said first connection, a flexible cable connected to said lever second end, said flexible cable extending downwardly through said leg and through said joint and connected to said leg, spring means acting on said joint to extend said cable and expand said joint, and drive means to cyclically swing said leg upper portion back and forth and to act on said lever to cyclically raise said lever second end whereby as the leg is moved forwardly said flexible cable causes collapsing of said joint to shorten the vertical height of said leg, and whereby said drive means cyclically releases said cable and said spring means thereby straightens the leg for forward driving engagement with the supporting surface.

References Cited in the file of this patent

UNITED STATES PATENTS

| | | |
|---|---|---|
| 589,982 | Rousseau | Sept. 14, 1897 |
| 2,667,719 | Edwardson | Feb. 2, 1954 |

FOREIGN PATENTS

| | | |
|---|---|---|
| 352,728 | France | June 8, 1905 |